(12) United States Patent
Greenfield et al.

(10) Patent No.: US 9,213,595 B2
(45) Date of Patent: Dec. 15, 2015

(54) HANDLING ERRORS IN TERNARY CONTENT ADDRESSABLE MEMORIES

(71) Applicant: International Business Machines Corporation, Armonk, NY (US)

(72) Inventors: Todd A. Greenfield, Rochester, MN (US); Joseph A. Kirscht, Rochester, MN (US); David A. Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 14/053,657

(22) Filed: Oct. 15, 2013

(65) Prior Publication Data

US 2015/0106676 A1    Apr. 16, 2015

(51) Int. Cl.
G06F 11/10     (2006.01)
G06F 21/64     (2013.01)
G06F 21/79     (2013.01)
G11C 29/52     (2006.01)
G11C 29/08     (2006.01)
G11C 29/42     (2006.01)

(52) U.S. Cl.
CPC .......... *G06F 11/1044* (2013.01); *G06F 11/102* (2013.01); *G06F 11/1004* (2013.01); *G06F 11/1008* (2013.01); *G06F 11/1028* (2013.01); *G06F 11/1048* (2013.01); *G06F 11/1064* (2013.01); *G06F 11/1072* (2013.01); *G06F 21/64* (2013.01); *G06F 21/79* (2013.01); *G11C 29/08* (2013.01); *G11C 29/42* (2013.01); *G11C 29/52* (2013.01)

(58) Field of Classification Search
CPC ............ G06F 11/1044; G06F 11/1064; G06F 11/1008; G06F 11/1004; G06F 11/102; G06F 11/1028; G06F 11/1048; G06F 11/1072; G06F 21/64; G06F 21/79; G11C 29/52; G11C 29/08; G11C 29/42
USPC ......... 714/758, 763, 768, 773, 767, 718, 719, 714/6.1; 711/108, 128, 158; 365/49.1, 365/49.17, 168, 201
See application file for complete search history.

(56) References Cited

U.S. PATENT DOCUMENTS

| | | |
|---|---|---|
| 5,012,472 A | 4/1991 | Arimoto et al. |
| 5,491,701 A | 2/1996 | Zook |
| 6,574,746 B1 | 6/2003 | Wong et al. |
| 7,257,672 B2 | 8/2007 | Shoham et al. |
| 7,568,146 B2 * | 7/2009 | Takahashi et al. ............ 714/763 |
| 7,594,158 B2 | 9/2009 | Wickeraad |
| 7,757,152 B2 | 7/2010 | Wickeraad et al. |
| 7,882,314 B2 * | 2/2011 | Allison et al. ................ 711/158 |
| 7,882,323 B2 * | 2/2011 | Allison et al. ................ 711/167 |
| 7,924,588 B2 | 4/2011 | Arsovski et al. |

(Continued)

*Primary Examiner* — John J Tabone, Jr.
(74) *Attorney, Agent, or Firm* — Robert Williams; Mark G. Edwards

(57) ABSTRACT

Receive a request to write a unit of data, having a first half of bits and a second half of bits, to an index of a ternary content addressable memory (TCAM). Generate a first error-correcting code (ECC) codeword for first bits of the first half of bits of the unit of data and first bits of the second half of bits of the unit of data. Generate a second error-correcting code (ECC) codeword for second bits of the first half of bits of the unit of data and second bits of the second half of bits of the unit of data. Store the first half of bits of the unit of data in the first row of the index. Store the second half of bits of the unit of data in the second row of the index.

7 Claims, 6 Drawing Sheets

(56) References Cited

U.S. PATENT DOCUMENTS

| | | | |
|---|---|---|---|
| 8,233,302 B2 | 7/2012 | Arsovski et al. | |
| 8,234,539 B2* | 7/2012 | Erez | 714/755 |
| 8,341,498 B2* | 12/2012 | D'Abreu et al. | 714/766 |
| 8,484,542 B2* | 7/2013 | d'Abreu et al. | 714/785 |
| 8,533,572 B2* | 9/2013 | Lu et al. | 714/773 |
| 8,806,297 B2* | 8/2014 | D'Abreu et al. | 714/763 |
| 8,862,967 B2* | 10/2014 | Pancholi et al. | 714/779 |
| 2004/0210815 A1* | 10/2004 | Ornes et al. | 714/758 |
| 2010/0241927 A1* | 9/2010 | Soma | 714/760 |
| 2010/0262889 A1* | 10/2010 | Bains | 714/758 |
| 2011/0154158 A1* | 6/2011 | Yurzola et al. | 714/758 |
| 2012/0102379 A1 | 4/2012 | D'Abreu et al. | |
| 2012/0117431 A1 | 5/2012 | Bremler-Barr et al. | |
| 2012/0221919 A1 | 8/2012 | Ekas et al. | |
| 2013/0024743 A1* | 1/2013 | Sharon et al. | 714/763 |
| 2013/0067296 A1 | 3/2013 | Takahashi | |
| 2013/0080859 A1 | 3/2013 | Cloetens | |
| 2013/0227374 A1* | 8/2013 | Desireddi | 714/758 |
| 2014/0068384 A1* | 3/2014 | Kwak et al. | 714/773 |
| 2014/0143619 A1* | 5/2014 | Gorman et al. | 714/719 |
| 2014/0173379 A1* | 6/2014 | Loh et al. | 714/764 |
| 2015/0106677 A1* | 4/2015 | Greenfield et al. | 714/767 |

\* cited by examiner

HANDLING ERRORS IN TERNARY CONTENT ADDRESSABLE MEMORIES

FIELD OF INVENTION

This disclosure relates generally to soft errors in memory devices, and more specifically, regards handling the number of errors experienced by a ternary content addressable memory (TCAM).

BACKGROUND

In electronics and computing, a soft error involves changes to data, but not changes to the physical circuit itself. If the data is rewritten, the circuit will work again. Soft errors can occur on transmission lines, in digital logic, analog circuits, magnetic storage, and elsewhere. One type of soft error is a chip-level soft error. These errors may occur when stray particles come into contact with devices on a chip. Because a particle contains a charge and kinetic energy, a particle can hit a device on the chip and cause a cell on the device to change state. If a stray particle were to come into contact with a memory device on a chip and a soft error occurred, the soft error may change the state of a data bit.

SUMMARY

Disclosed herein are embodiments of a method for generating a first and second error-correcting code (ECC) codeword for a unit of data and writing the unit of data to a ternary content addressable memory (TCAM). In an embodiment, the method may include receiving a request to write a unit of data, having a first half of a plurality of bits and a second half of a plurality of bits, to an index of a TCAM, the index having a first row and a second row. In addition, the method may include generating a first ECC codeword for first bits of the first half of the plurality of bits of the unit of data and first bits of the second half of the plurality of bits of the unit of data. The method may also include generating a second ECC codeword for second bits of the first half of the plurality of bits of the unit of data and second bits of the second half of the plurality of bits of the unit of data. Furthermore, the method may include storing the first half of the plurality of bits of the unit of data in the first row of the index and store the second half of the plurality of bits of the unit of data in the second row of the index.

Also disclosed herein are embodiments of a method for verifying a unit of data, having a plurality of bits, for an index of a TCAM, the index having a first row and a second row of memory cells. In an embodiment, the method may include receiving an error check request for the TCAM. In addition, the method may include verifying a first ECC codeword against a first portion of the unit of data that includes first bits from the memory cells of the first row and first bits from the memory cells of the second row. Furthermore, the method may include verifying a second ECC codeword against a second portion of the unit of data that includes second bits from the memory cells of the first row and second bits from the memory cells of the second row.

Also disclosed herein are embodiments of a system for verifying a unit of data, having a first half of a plurality of bits and a second half of a plurality of bits, for an index of a TCAM, the index having a first row and a second row of memory cells. In an embodiment, the system may include an ECC codeword generator configured to generate a first error-correcting code ECC codeword for first bits of the first half of the plurality of bits of the unit of data and first bits of the second half of the plurality of bits of the unit of data. The ECC codeword generator may be further configured to generate a second ECC codeword for second bits of the first half of the plurality of bits of the unit of data and second bits of the second half of the plurality of bits of the unit of data. The system may also include a TCAM configured to receive a request to write the unit of data to the TCAM, store the first half of the plurality of bits of the unit of data in the first row of the index, store the second half of the plurality of bits of the unit of data in the second row of the index, and receive an error check request for the unit of data.

DETAILED DESCRIPTION

Figure 1:
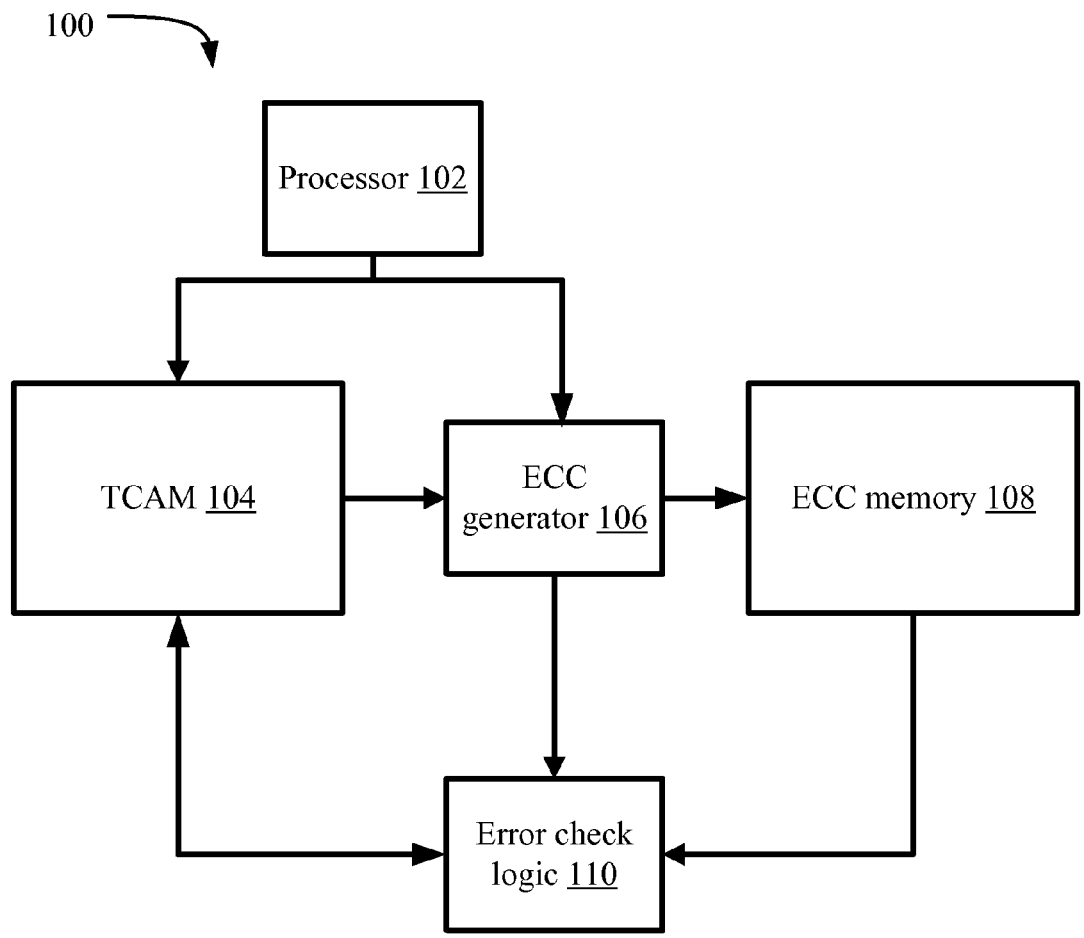
FIG. 1 depicts a system for generating a first and second ECC codeword for a unit of data, receiving a request to write the unit of data to an index of a TCAM, and verifying the unit of data

Whether or not a memory device experiences a soft error depends on the energy of the incoming particle, the geometry of the memory, and the location of the strike. Memory devices with higher capacitance and higher voltages are less likely to suffer an error. This combination of capacitance and voltage is described by the critical charge parameter. The critical charge parameter is the minimum charge disturbance needed to change a memory bit from one state to another. A higher critical charge parameter means fewer soft errors. However, operating voltages continue to fall and memory device densities continue to increase, decreasing the distance between memory bit cells. This may decrease the value of the critical charge parameter, therefore, a memory device may be affected by charged particles more frequently since lower-energy particles may be able to change the state of a memory bit. If a charged particle hits a memory bit cell within an array of a memory device, there are probabilities associated with upsets to the neighboring bits in the same row as well as bits within adjacent rows caused by the same charged particle. These probabilities get smaller the further away the neighboring bit is relative to the memory bit cell that was hit by the charged particle.

Many memory devices are composed of memory bit cells arranged in a two-dimensional grid. However, content addressable memories (CAMs) are composed of memory bit cells with added comparison circuitry that enable a search operation of the contents of each memory bit cell. When a search key is provided, the key is compared with each row in a CAM and any row matching the key provides a match indication. There are two basic forms of CAMs, binary and ternary. Binary CAMs support storage and searching of binary bits, zero and one. Ternary CAMs (TCAMs) are similar memory structures that support storing encoded values corresponding to zero, one, always match (wildcard), or never match. For example, if a wildcard, always match encode, is stored for a given TCAM entry and a search is performed, a search operation will yield a match condition, independent of the value of the corresponding bit of the search key. Likewise, if a never match encode is stored for a given TCAM entry, a search operation will not yield a match condition, independent of the value of the corresponding bit of the search key. To support the four encoded values, a TCAM is composed of indexes, each index consisting of two rows of memory bit cells and comparison circuitry. The two physical circuit rows corresponding to a single TCAM index are generically referred to as the "X" and "Y" rows in the discussion that follows. A bit may be stored in a column of row X and another bit may be stored in the same column in row Y. The TCAM may then use one value to represent two bits. The encoded value may take on either zero, one, or a wildcard value and the value of the encode is dependent on the logic of each particular TCAM. When a search key is provided, the key is compared to the encoded values representing the two bits stored in each column of row X and row Y. Any row of encoded values matching each bit of the search key with either the identical values or a combination of identical values and wildcard, always match values, provides a match indication.

For example, if a zero is stored in row X of index 1 of the TCAM and a zero is stored in row Y of index 1 of the TCAM, the encoded value may be a wildcard, always match bit. Therefore, the search key bit will match no matter if it is a zero or a one. If a one is stored in row X and a zero is stored in row Y, the encoded value may be a zero. Therefore, if the search key bit is a zero it will match and if it is a one it will not match. If a zero is stored in row X and a one is stored in row Y, the encoded value may be a one. Therefore, if the search key bit is a zero it will not match and if it is a one it will match. If a one is stored in row X and a one is stored in row Y, the encoded value may be a never match bit. Therefore, the search key bit will not match no matter if it is a zero or a one.

A search key can match on multiple entries within a TCAM because of the ability of a TCAM to have a wildcard encoded value. Therefore, it is common practice to use priority encoding of the TCAM to determine the index of the highest or lowest ranking matching entry. The index that is chosen is likely to be used to perform subsequent access to another data array such as an SRAM, register array, etc. to acquire needed data. A soft error in any bit of the TCAM could result in multiple problems. For instance, a match on a TCAM encoded value that normally would not have a match may, result in acquisition of incorrect data from a subsequent data array. A not match on a TCAM encoded value that normally would have a match, may result in a match on an encoded value with a higher or lower ranking, resulting in acquisition of incorrect data from a subsequent data array.

There is a probability that, bits in memory bit cells near a memory bit cell that has been contacted by a charged particle, may change state. As stated herein, if a charged particle hits a memory bit cell within an array of a memory device, there are probabilities associated with upsets to the neighboring bits in the same row, as well as bits within adjacent rows, caused by the same charged particle. These probabilities get smaller the further away the neighboring bit is relative to the memory bit cell that was hit by the charged particle. Also stated herein, a TCAM is composed of memory bit cells with added comparison circuitry that enable a search operation of the contents of each memory bit cell. Often, a memory bit cell and comparison circuitry consume the same chip area as two memory bit cells. Furthermore, the comparison circuitry is immune from upsets due to charged particles. Therefore, because the density of memory bit cells is less in a TCAM than in other memory devices, the probability of changes in state for bits near a memory bit cell that has been contacted by a charged particle in a TCAM, is generally less than other memory devices.

To detect whether errors occur in a TCAM, an error-correcting code (ECC) codeword may be generated. An ECC codeword is generated by employing parity bits. A parity bit is a term that describes whether a bit or bits is even or odd. An ECC codeword uses multiple parity bits that are stored with the unit of data or in a separate memory. When the unit of data is read back from a TCAM, the parity of each bit of the unit of data and the parity of the parity bits is evaluated using check bits. If the total parity is correct, it signifies that no error has occurred. If one or more of the parity values is incorrect, it signifies an error has occurred.

A single-bit error occurs when a bit changes state from one to zero or zero to one. A multi-bit error occurs when more than one bit changes state from one to zero or zero to one. During the timeframe between the bit upset event and the detection of the error, all searches of the TCAM are susceptible to being incorrect. Furthermore, many multi-bit errors cannot be corrected by ECC and it may be necessary for an interrupt to be sent to software or firmware to reload an entry, thus elongating the time in which the search results are susceptible to being incorrect.

Since TCAM indexes consist of two rows, ECC codewords may be formulated so as to minimize the probability of a multi-bit uncorrectable error. To minimize chip area required to store ECC codewords, it would be desirable to include all bits of both rows of an index in a single ECC codeword. However, the probability of a change of state of a bit in a memory bit cell close to a memory bit cell that has been contacted by a charged particle and causing a multi-bit error, is too great. Therefore, two ECC codewords may be generated for every XY row pair. In general, it is common practice to generate one ECC codeword to cover each row of an array such as an SRAM, Register File, eDRAM or the like. For a TCAM, this would imply a first ECC codeword to cover the X row and a second ECC codeword to cover the Y row. Doing so would completely isolate bit errors in the X row from bit errors in the Y row, eliminating the exposure to multi-cell errors contained within the same column. However, adjacent bits within the same row continue to be exposed to an uncorrectable error due to a multi-bit upset. Because both rows corresponding to a single TCAM index must be read to obtain the encoded value when performing an error check, strategically choosing a subset of bits from both the X and Y rows to form a first ECC codeword and the remainder of bits from both the X and Y rows to form a second ECC codeword can reduce the exposure to an uncorrectable error due to a multi-bit upset.

In an embodiment, the ECC codeword may be formed using every other bit of the first row with every other bit of the second row. More specifically, one ECC codewords may be formed using the even bits of the X row interlaced with the odd bits of the Y row and the second ECC codeword may be formed using the odd bits of the X row interlaced with the even bits of the Y row. By doing so, adjacent column bits within the same row and adjacent row bits are never contained within the same ECC codeword. Since the bits in adjacent memory bit cells, to the memory bit cell that has been contacted by a charged particle, have the highest probability of changing state, the probability of a multi-bit error may be reduced, thus, improving the probability of recovering from a charged particle contacting a TCAM.

In another embodiment, an ECC codeword may be formed using the bits from every other column. More specifically, one ECC codeword may be formed using the even bits of the X and Y rows and the second ECC codeword may be formed using the odd bits of the X and Y rows. By using the same ECC codeword for the X and Y rows, multi-bit errors in the same column of the two rows of the index can be corrected. Also, because comparison circuitry is immune from upsets due to charged particles and a TCAM has a memory bit cell and comparison circuitry that consumes the same chip area as two memory bit cells, there is a four column separation between columns of the same ECC codeword. Therefore, there may be a zero probability of a triple bit error.

Embodiments herein provide for generating a first and second ECC codeword, receiving a request to write a unit of data to an index of a TCAM, and verifying the unit of data. The system and method allow for the generation of two ECC codewords for a unit of data. Embodiments may store the unit of data in the TCAM and receive an error check request. The first ECC codeword may then be compared against the even bits of the first portion of the unit of data and the odd bits of the second portion of the unit of data. The second ECC codeword may be compared against the odd bits of the first portion of the unit of data and the even bits of the second portion of the unit of data. Single-bit and multi-bit errors may then be detected for the first and second portions of the unit of data. Notification may be given if a single-bit error or multi-bit error has occurred and a single-bit error may be corrected and in another embodiment, a single-bit error and a multi-bit error may be corrected.

Turning now to the figures, FIG. 1 depicts a system 100 for generating a first and second ECC codeword for a unit of data, receiving a request to write the unit of data to an index of a TCAM, and verifying the unit of data, consistent with embodiments of the present disclosure. The system 100 may include a processor 102, a TCAM 104, an ECC generator 106, an ECC memory 108, and an error check logic 110.

In certain embodiments, the processor 102 may send a unit of data to the TCAM 104 and to the ECC generator 106. The TCAM 104 may divide the unit of data into a first portion and a second portion, assign the first portion to a first row of an index and assign the second portion to a second row of the index, and store the first portion in the first row of the index and store the second portion in the second row of the index. The ECC generator 106 may generate a first ECC codeword for the even bits of the first portion of the unit of data and odd bits of the second portion of the unit of data. The ECC generator 106 may also generate a second ECC codeword for the odd bits of the first portion of the unit of data and even bits of the second portion of the unit of data. The first ECC codeword and the second ECC codeword may then be sent from the ECC generator 106 to the ECC memory 108 and stored in the ECC memory 108.

Consistent with certain embodiments, the error check logic 110 may request an error check of the TCAM 104. The ECC memory 108 may send the first ECC codeword and the second ECC codeword to the error check 110. The TCAM may send the first portion of the unit of data and the second portion of the unit of data to the error check logic 110. The error check logic 110 may compare the first ECC codeword against the even bits of the first portion of the unit of data and the odd bits of the second portion of the unit of data. The error check logic 110 may also compare the second ECC codeword against the odd bits of the first portion of the unit of data and the even bits of the second portion of the unit of data.

In various embodiments, the error check logic 110 may detect that no error has occurred to the unit of data based upon the comparisons of the first and second ECC codewords. The error check logic 110 may, however, detect that an error has occurred to the unit of data based upon the comparisons of the first and second ECC codewords. If an error is detected, the error check logic 110 may determine whether a single-bit error or a multi-bit error occurred in the even bits of the first portion of the unit of data and the odd bits of the second portion of the unit of data, and whether a single-bit error or a multi-bit error occurred for the odd bits of the first portion of the unit of data and the even bits of the second portion of the unit of data. If a single-bit error or a multi-bit error has occurred, a notification may be sent detailing that an error has occurred in the index of the TCAM. If the error or errors are identified to be single-bit errors, the error check logic 110 may determine which bit has changed state in the even bits of the first portion of the unit of data and the odd bits of the second portion of the unit of data, or which bit has changed state in the odd bits of the first portion of the unit of data and the even bits of the second portion of the unit of data, or both. The error check logic 110 may then flip the identified bit or bits back to their original state, fixing the error. If the error or errors are identified to be multi-bit errors, it may be necessary for the error check logic 110 to send an interrupt to software or firmware to reload the unit of data into the TCAM. In another embodiment, if a multi-bit error is detected, the error check logic 110 may flip the identified bits back to their original state, fixing the error.

Figure 2:
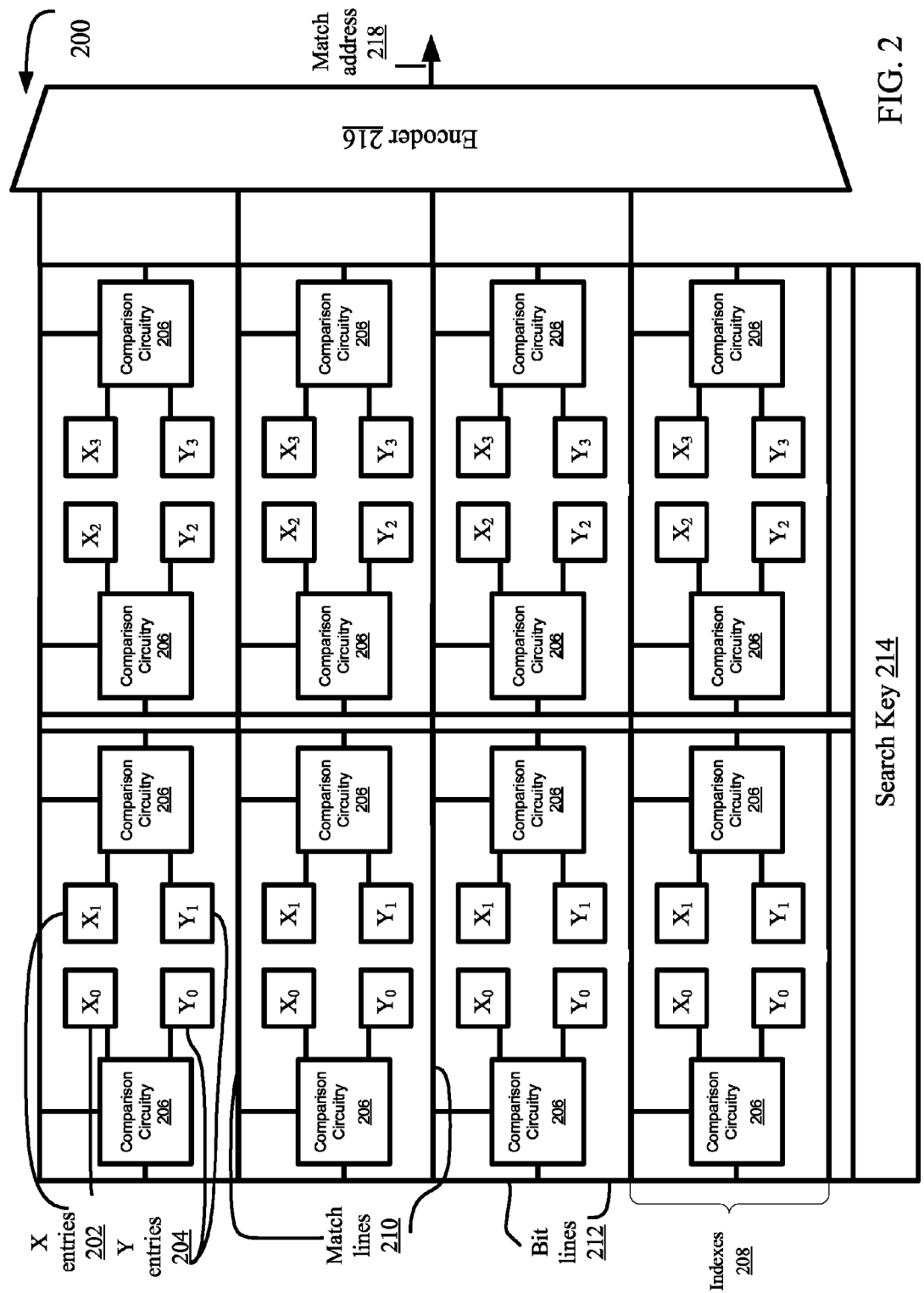
FIG. 2 depicts a block diagram of a simplified 4×8 bit TCAM with a compare logic based architecture and priority encoder to translate the match line to an encoded TCAM index.

FIG. 2 depicts a block diagram of a simplified 4×8 bit TCAM 200 with a compare logic based architecture, consistent with embodiments of the present disclosure. The TCAM 200 may include X bit entries 202, Y bit entries 204, comparison circuitry 206, indexes 208, match line 210, bit line 212, a search key 214, an encoder 216, and a match address 218.

Consistent with various embodiments, the processor 102, from FIG. 1, may send a unit of data to the TCAM 200. The unit of data may be divided into a first portion and a second portion. The first portion of data may be assigned to the X bit entries 202 in index 208 and stored in the X bit entries 202. The second portion of data may be assigned to the Y bit entries 204 of the same index 208 and stored in the Y bit entries 204. This process may be repeated for multiple units of data and for multiple indexes 208 in the TCAM 200.

In certain embodiments, a search key 214 may come in to be matched with an index 208 or indexes 208 of the TCAM 200. Each bit of the search key 214 may travel up a bit line 212 and the bits may be simultaneously compared to the encoded values of the X bit entries 202 and the Y bit entries 204, using the comparison circuitry 206. If a bit is found to match with an encoded value, the bit may be sent down the match line 210. If each bit of the search key 214 matches all the encoded values of an index, the search key 214 is sent down the match line 210, to the encoder 216. The encoder 216 may then generate the match address 218 that may provide access to another data array such as an SRAM, register array, etc.

Figure 3:
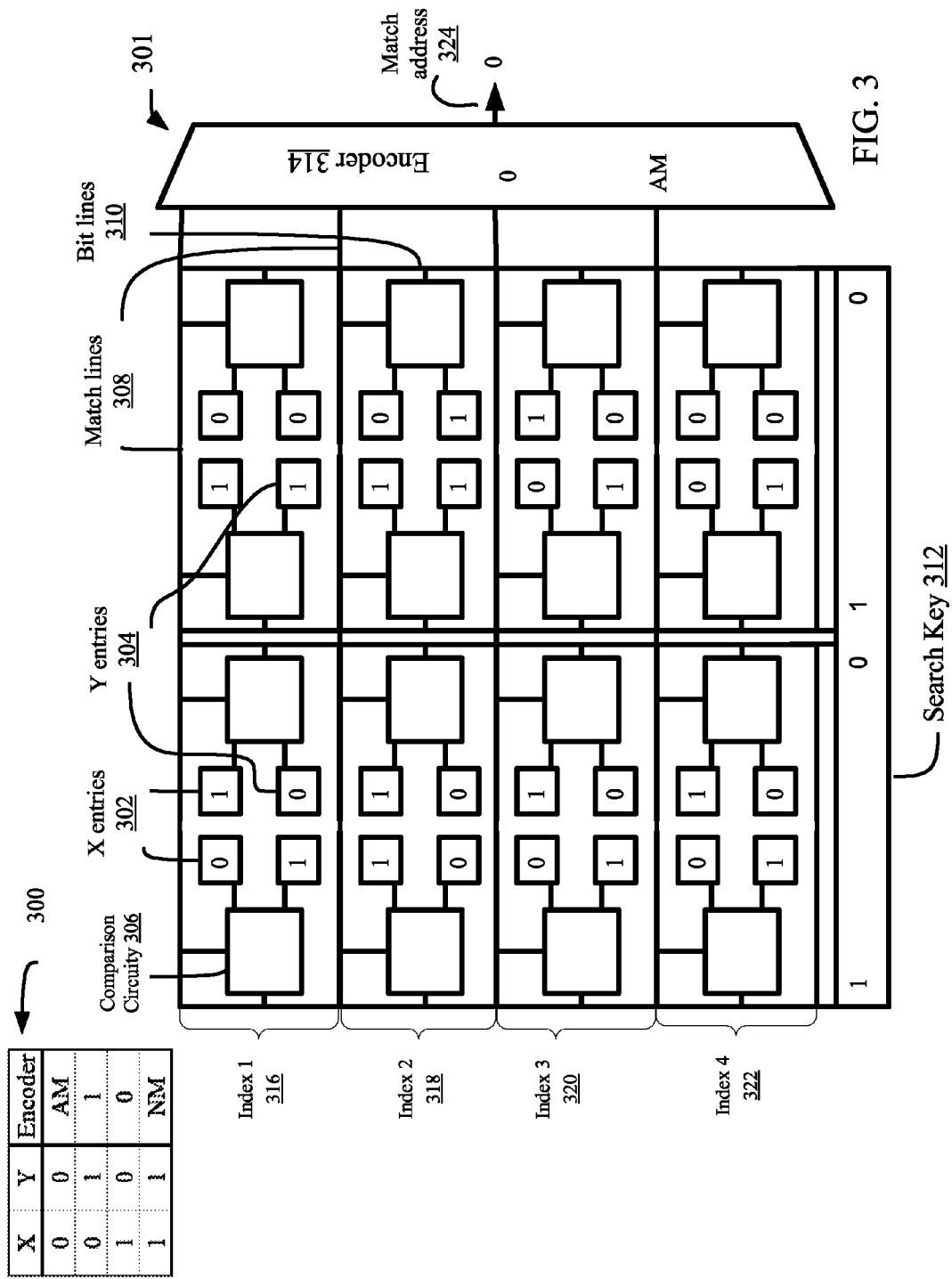
FIG. 3 depicts a truth table and a block diagram of a simplified 4×8 bit TCAM with a compare logic based architecture that performs the logic of the truth table.

FIG. 3 depicts a truth table 300 and a block diagram 301 of a simplified 4×8 bit TCAM with a compare logic based architecture that performs the logic of the truth table, consistent with embodiments of the present disclosure. The TCAM 301 may include X bit entries 302, Y bit entries 304, comparison circuitry 306, match lines 308, bit lines 310, a search key 312, an encoder 314, index 1 316, index 2 318, index 3 320, index 4 322, and a match address 324.

Consistent with certain embodiments, when the X entry 302 is zero and the Y entry is zero, the encoded value is a wildcard and always matches (AM) the search key 312. When the X entry 302 is zero and the Y entry 304 is one, the encoded value is one and matches the search key 312 when the search key 312 is one. When the X entry 302 is one and the Y entry 304 is zero, the encoded value is zero and matches the search key 312 when the search key 312 is zero. When the X entry 302 is one and the Y entry 304 is one, the encoded value is a wildcard and never matches (NM) the search key 312.

In certain embodiments, a first unit of data is 01101010 and may be assigned and stored into the X entries 302 and the Y entries 304 of index 1 316. A second unit of data may be 11100011 and may be assigned and stored into the X entries 302 and the Y entries 304 of index 2 318. A third unit of data may be 01011010 and may be assigned and stored into the X entries 302 and the Y entries 304 of index 3 320. A fourth unit of data may be 01001010 and may be assigned and stored into the X entries 302 and the Y entries 304 of index 4 322. The encoded values of index 1 316 may be 1 0 NM AM. The encoded bits values of index 2 318 may be 0 0 NM 1. The encoded values of index 3 320 may be 1 0 1 0. The encoded values of index 4 322 may be 1 0 1 AM. Each bit of the search key 312 may travel up the bit lines 310 and the bits may be simultaneously compared to the encoded values of index 1 316, index 2 318, index 3 320, and index 4 322, using the comparison circuitry 306. Since index 1 316 and index 2 318 both have a NM bit, the search key 312 may not match the encoded values of index 1 316 or index 2 318. The search key 312 may match the encoded values of both index 3 320 and index 4 322 because the search key 312 of 1 0 1 0 is either identical to the encoded values or the encoded values have a combination of identical values with the search key and wildcard, always match values. The bits are then sent down both match lines 308 to the encoder 314. Index 3 320 and index 4 322 may be ranked from highest to lowest by the encoder 314, selecting numerically, the smallest numbered match line 308 of the two match lines 308, generating the match address 324 of 0. This match address 324 may be used as an input to another data array such as an SRAM, register array, etc.

Figure 4:
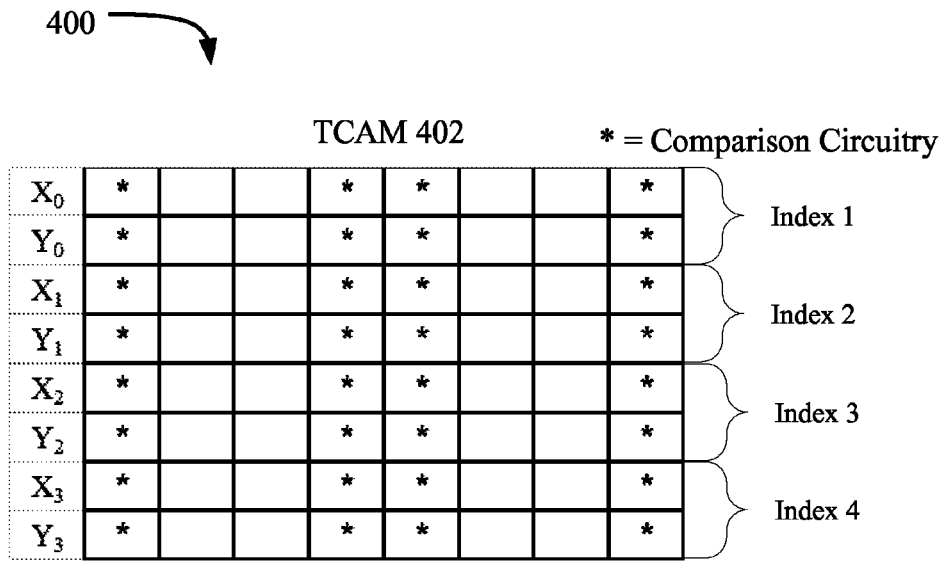
FIG. 4 depicts an error check of a TCAM.

FIG. 4 depicts an error check 400 of a TCAM, consistent with embodiments of the present disclosure. The error check may include a TCAM 402, index 1 of the TCAM 404, an ECC memory 406, and index 1 of the TCAM at the time of the error check 408.

Consistent with certain embodiments, the two-dimensional TCAM 402 may be composed of indexes. Each index consists of two rows and the rows are composed of memory bit cells and comparison circuitry cells. An ECC1 codeword of 010 and ECC2 codeword of 000 may be generated for a unit of data 01101010 and stored in the ECC memory 406. A first portion of the unit of data may be assigned and stored in the memory bit cells of index 1 of the TCAM 404 and a second portion of the unit of data may be assigned and stored in the memory bit cells of row 2 of index 1 of the TCAM 404. Over time, bits may have changed state, so index 1 of the TCAM 404 may have changed to index 1 of the TCAM 408 and the error check logic 110, from FIG. 1, may request an error check of the TCAM 408. ECC1 may then be compared against the even memory cell bits of the first row and the odd memory cell bits of the second row of index 1 of the TCAM at the time of the error check 408. ECC2 may be compared against the odd memory cell bits of the first row and the even memory cell bits of the second row of index 1 of the TCAM at the time of the error check 408. From the bit states that are in index of the TCAM at the time of the error check 408, the ECC1 comparison may show that a single-bit error has occurred for the even memory cell bits of the first row and the odd memory cell bits of the second row of index 1 of the TCAM at the time of the error check 408. Furthermore, the ECC2 comparison may show that no error has occurred for the odd memory cell bits of the first row of and the even memory cell bits of the second row of index 1 of the TCAM at the time of the error check 408. A notification may then be sent that a single-bit error has occurred and the single-bit error may be corrected.

Figure 5:
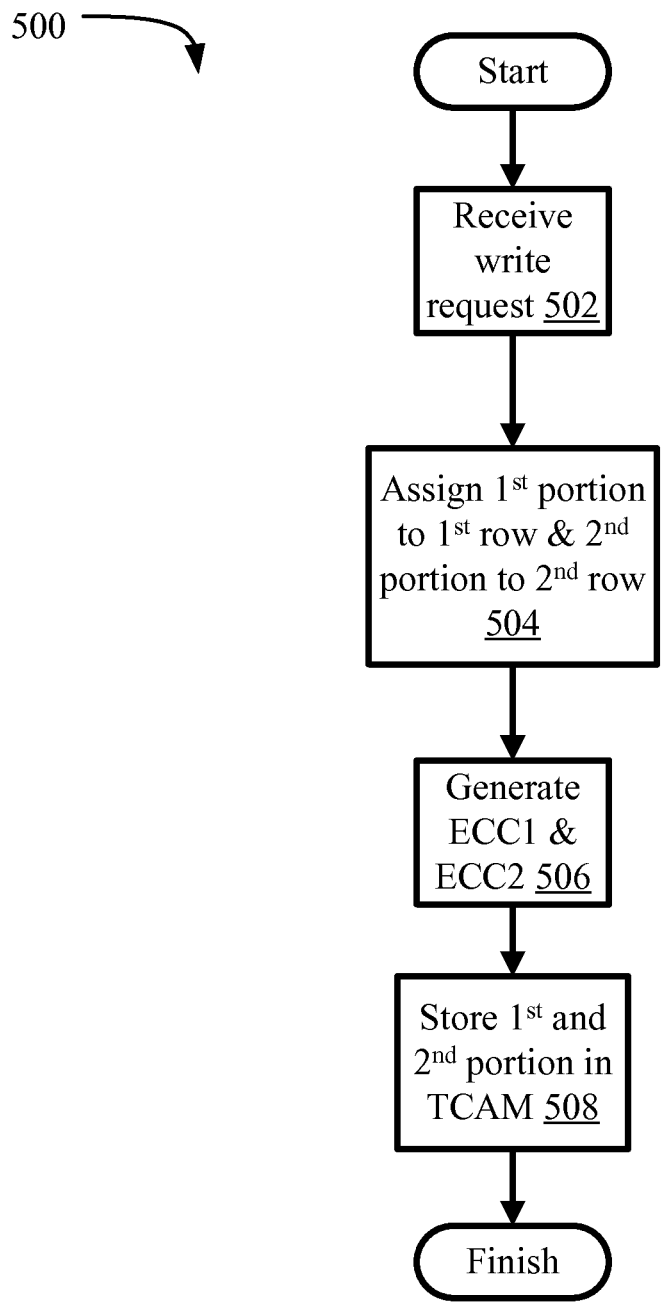
FIG. 5 depicts a high-level method for generating a first and second ECC codeword for a unit of data and writing the unit of data to a TCAM.

FIG. 5 depicts a high-level method 500 for generating a first and second ECC codeword for a unit of data and writing the unit of data to a TCAM, consistent with embodiments of the present disclosure. At operation 502, a request may be received to write the unit of data to an index of the TCAM 104, from FIG. 1. At operation 504, a first portion of the unit of data may be assigned to a first row of the index and a second portion of the unit of data may be assigned to a second row of the index. At operation 506, the first ECC codeword may be generated from the even bits of the first portion of the unit of data and the odd bits of the second portion of the unit of data. Also, at operation 506, the second ECC codeword may be generated from the odd bits of the first portion of the unit of data and the even bits of the second portion of the unit of data. In another embodiment, at operation 506, the first ECC codeword may be generated from the even bits of the first portion of the unit of data and the even bits of the second portion of the unit of data. Also, at operation 506, the second ECC codeword may be generated from the odd bits of the first portion of the unit of data and the odd bits of the second portion of the unit of data. The first and second ECC codewords may then be store in the ECC memory 108, from FIG. 1. At operation 508, the first portion of the unit of data may then be stored in the first row of the index of the TCAM 104 and the second portion of the unit of data may be stored in the second row of the index of the TCAM 104.

Figure 6:
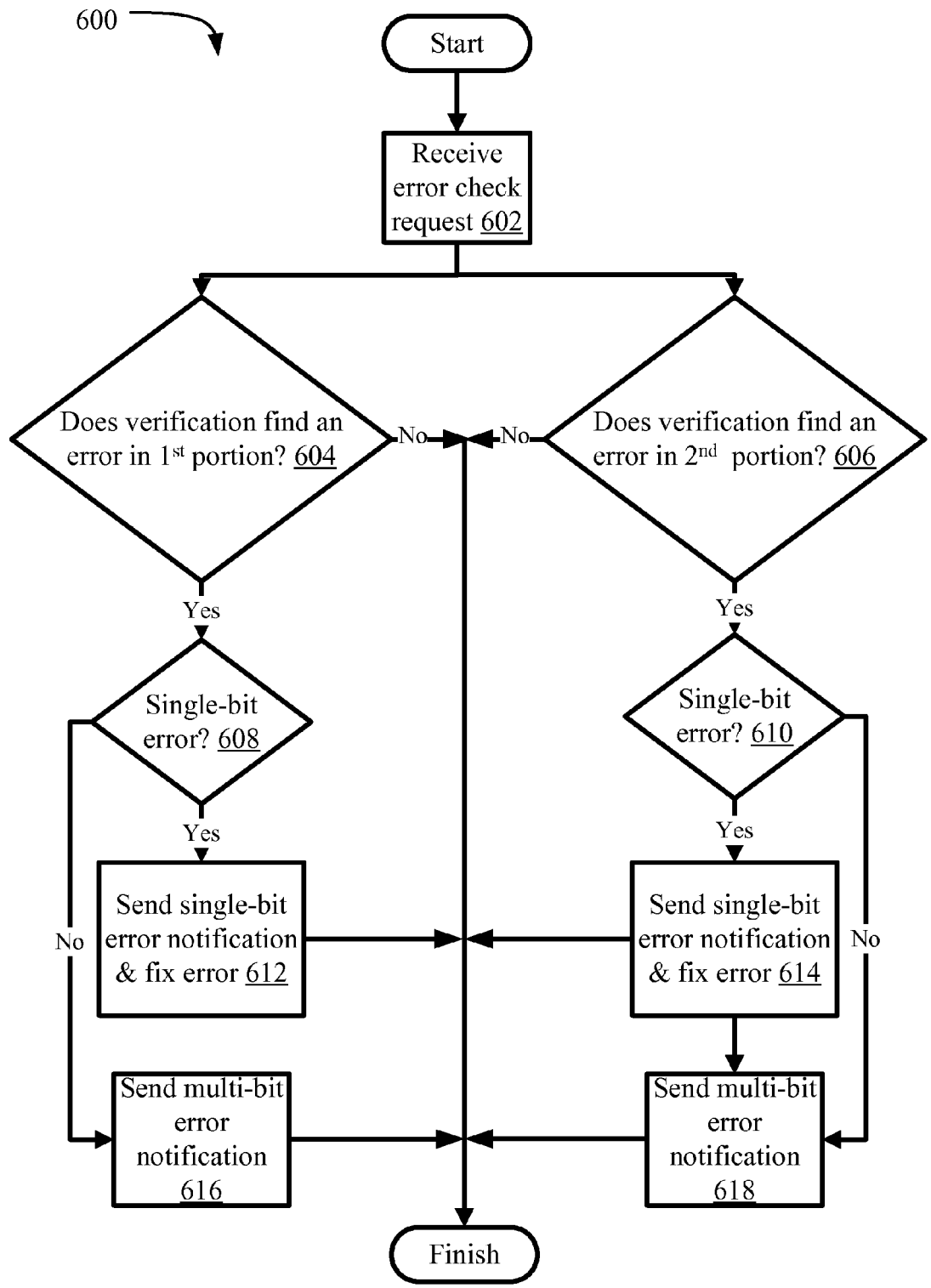
FIG. 6 depicts a high-level method for verifying a unit of data

FIG. 6 depicts a high-level method 600 for verifying a unit of data, consistent with embodiments of the present disclosure. At operation 602, a request may be received to error check the TCAM 104, from FIG. 1, from the error check logic 110, from FIG. 1. At operation 604, the first ECC codeword is retrieved from the ECC memory 108, from FIG. 1, and verifies whether an error has occurred in a first portion of the unit of data. Also, at operation 606, the second ECC codeword is retrieved from the ECC memory 108 and verifies whether an error has occurred in a second portion of the unit of data. If no errors are found, the verification of the unit of data 600 is complete.

Consistent with various embodiments, if an error is found in the first portion of the unit of data, operation 608 may determine if the error is a single-bit error. Also, if an error is found in the second portion of the unit of data, operation 610 may determine if the error is a single-bit error. If the error in the first portion of the unit of data is a single-bit error, operation 612 may send a notification that a single-bit error has occurred and fix the error. If the error in the first portion of the unit of data is not a single-bit error, operation 616 may send a notification that a multi-bit error has occurred and it may be necessary for an interrupt to be sent to software or firmware to reload the unit of data. In another embodiment, if the error in the first portion of the unit of data is not a single-bit error, operation 616 may send a notification that a multi-bit error has occurred and fix the error. Furthermore, if the error in the second portion of the unit of data is a single-bit error, operation 614 may send a notification that a single-bit error has occurred and fix the error. If the error in the second portion of the unit of data is not a single-bit error, operation 618 may send a notification that a multi-bit error has occurred and it may be necessary for an interrupt to be sent to software or firmware to reload the unit of data. In another embodiment, if the error in the second portion of the unit of data is not a single-bit error, operation 618 may send a notification that a multi-bit error has occurred and fix the error While the invention has been described with reference to the specific aspects thereof, those skilled in the art will be able to make various modifications to the described aspects of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

The invention claimed is:

1. A system for verifying a unit of data, having a first half of a plurality of bits and a second half of a plurality of bits, for an index of a ternary content addressable memory (TCAM), the index having a first row and a second row of memory cells, the system comprising:
   an error-correcting code (ECC) codeword generator configured to:
      generate a first error-correcting code (ECC) codeword for first bits of the first half of the plurality of bits of the unit of data and first bits of the second half of the plurality of bits of the unit of data, and
      generate a second error-correcting code (ECC) codeword for second bits of the first half of the plurality of bits of the unit of data and second bits of the second half of the plurality of bits of the unit of data;
   a TCAM configured to:
      receive a request to write the unit of data to the TCAM,
      store the first half of the plurality of bits of the unit of data in the first row of the index,
      store the second half of the plurality of bits of the unit of data in the second row of the index, and
      receive an error check request for the unit of data.

2. The system of claim 1, further comprising:
   an error check logic tool configured to:
      verify the first ECC codeword against a first portion of the unit of data that includes first bits from the memory cells of the first row and first bits from the memory cells of the second row, and
      verify the second ECC codeword against a second portion of the unit of data that includes second bits from the memory cells of the first row and second bits from the memory cells of the second row.

3. The system of claim 2, the error check logic tool further configured to:
   determine whether a single-bit error or a multi-bit error has occurred in response to verifying the first ECC codeword and the second ECC codeword; and
   generate a single-bit error or a multi-bit error notification in response to the determination of an occurrence of the single-bit error or the multi-bit error.

4. The system of claim 3, the error check logic tool further configured to:
   correct the single-bit error.

5. The system of claim 3, the error check logic tool further configured to:
   correct the multi-bit error.

6. The system of claim 1, wherein the first bits of the first half of the plurality of bits of the unit of data are even bits, the first bits of the second half of the plurality of bits of the unit of data are odd bits, the second bits of the first half of the plurality of bits of the unit of data are odd bits, and the second bits of the second half of the plurality of bits of the unit of data are even bits.

7. The system of claim 1, wherein the first bits of the first half of the plurality of bits of the unit of data are even bits, the first bits of the second half of the plurality of bits of the unit of data are even bits, the second bits of the first half of the plurality of bits of the unit of data are odd bits, and the second bits of the second half of the plurality of bits of the unit of data are odd bits.

* * * * *